United States Patent
Li et al.

(10) Patent No.: US 8,565,817 B2
(45) Date of Patent: Oct. 22, 2013

(54) COMMUNICATION SYSTEM

(75) Inventors: Yu-Hsien Li, Taipei (TW); Chen-Chou Lin, Taipei (TW)

(73) Assignee: UTW Technology Co. Ltd., Taipei (TW)

( * ) Notice: Subject to any disclaimer, the term of this patent is extended or adjusted under 35 U.S.C. 154(b) by 23 days.

(21) Appl. No.: 12/950,566

(22) Filed: Nov. 19, 2010

(65) Prior Publication Data

US 2011/0124371 A1    May 26, 2011

(30) Foreign Application Priority Data

Nov. 20, 2009    (TW) .............................. 98139513 A

(51) Int. Cl.
*H04M 1/00*    (2006.01)

(52) U.S. Cl.
USPC ................ 455/556.1; 455/557; 455/575.1; 379/142.15; 379/428.02

(58) Field of Classification Search
USPC ........ 455/74.1, 90.2, 90.3, 462, 550.1, 556.1, 455/557, 575.1; 379/142.15, 428.02, 435, 379/446, 454, 455
See application file for complete search history.

(56) References Cited

U.S. PATENT DOCUMENTS 7,110,789 B1 * 9/2006 Curtiss et al. .............. 455/556.1
7,447,176 B2 * 11/2008 Ruan et al. ................... 370/331

FOREIGN PATENT DOCUMENTS

JP    2000-286929    10/2000
JP    2005-341157    12/2005

* cited by examiner

*Primary Examiner* — Tuan H Nguyen
(74) *Attorney, Agent, or Firm* — Muncy, Geissler, Olds & Lowe, PLLC

(57) ABSTRACT

A docking station for use with a wireless communication device is provided. The docking station includes a base, a handset and a transmission device. The base includes a wireless communication device connector that connects to the wireless communication device. The handset connects to the base. The transmission device is disposed on the base. The handset can be enabled by the wireless communication device through the transmission device so that the handset can be used to communicate with others. When the handset is in operation, the wireless communication device can be operated simultaneously.

16 Claims, 4 Drawing Sheets

COMMUNICATION SYSTEM

This application claims priority based on Taiwanese Patent Application No. 098139513, filed on Nov. 20, 2009, the disclosure of which is incorporated herein by reference in its entirety.

BACKGROUND OF THE INVENTION

1. Field of the Invention

The present invention relates to a communication system; particularly, the present invention relates to a communication system including a docking station and a wireless communication device to integrate the functions of wireless phones and line telephones.

2. Description of the Related Art

Wireless communication devices have been popular with people since they became available in the market either because of the advantages of them having lighter weight, thinner thickness, shorter length and smaller volume in appearance or because of the enhancements in function. Consequently, wireless communication devices, such as mobile phones which, being portable and providing various functions, substitute conventional line telephones, became popular in a short period of time.

However, in indoor environments such as residencies or offices, landline telephones are still extensively used because of their advantages such as stability and reliability. Especially for telephone systems used extensively in enterprises which compose of a telephone switchboard and its extensions, fixed telephone stations which can be put on desks or in conference rooms like a landline telephone are still commonly favored.

Therefore, since wireless phones and landline telephones each has its advantage over the other, as there is increasing demand for the variety of functions of electronic products in the market, whether a communication product is competitive or not depends on whether it can integrate the functions of wireless phones and landline telephones to meet the requirements of a competitive market.

Besides, for conventional wireless phones, if the user wants to perform other functions while performing communication functions—for instance, receiving e-mails at the same time as answering a phone call—additional equipment such as earphones or speakers are required to resolve problems such as the inconvenience of checking the screen of the wireless phone at the same time as answering a phone call. Particularly, wireless phones are generally solely used without earphones, and speakers are generally not convenient to use in public places such as offices. As a result, in order to perform other functions at the same time as when answering a phone call, the user usually has to promptly find an earphone and connect it to the wireless phone, and this consequently results in a burden to the user. Besides, the earphone wire is usually long and easily becomes intertwined, and therefore often bothers the user.

SUMMARY OF THE INVENTION

It is an objective of the present invention to provide a communication system. In comparison with prior arts, it effectively integrates the functions of wireless phones and landline telephones so that it has the advantages of both.

It is another objective of the present invention to provide a communication system. In comparison with prior arts, with the help of a handset, other functions can be performed on the wireless communication device at the same time as when performing communication functions.

The communication system of the present invention includes a wireless communication device and a docking station. The wireless communication device is capable of conducting phone calls and transmission of data through wireless communication and includes a touch panel for operating the wireless communication device. The docking station can be used with the wireless communication device and includes a base, a handset, a transmission device, and a cable network interface. The base includes a wireless communication device connector that connects to the wireless communication device. The handset connects to the base. The transmission device is disposed on the base. The cable network interface is disposed on the base. When the wireless communication device is connected with the base, a fixed network or a mobile network is selected to conduct a phone call and/or transmission of data through the wireless communication or the cable network interface. During the phone call is conducted, the handset can be enabled by the wireless communication device through the transmission device so that the handset can be used to communicate with others. When the handset is in operation, the wireless communication device can be operated simultaneously.

DETAILED DESCRIPTION OF THE PREFERRED EMBODIMENT

The present invention provides a communication system including a docking station and a wireless communication device. In a preferred embodiment, the docking station for use with the wireless communication device can be installed in places such as offices, conference rooms, residencies, etc.

Figure 1A:
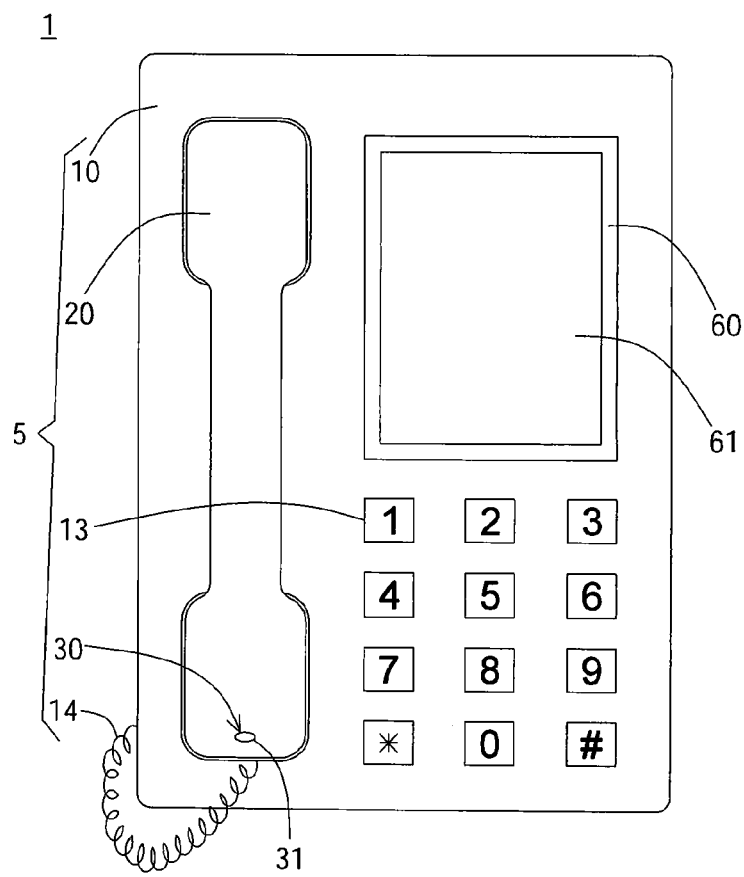
FIG. 1A is a schematic view of an embodiment of the present invention of a communication system including a docking station and a wireless communication device.
Figure 1B:
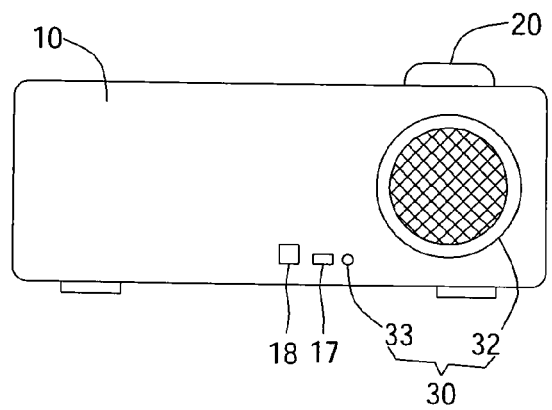
FIG. 1B is another schematic view of the docking station for use with a wireless communication device shown in FIG. 1A from a different angle.

FIG. 1A is a schematic view of an embodiment of the present invention of a communication system including a docking station and wireless communication device; FIG. 1B is another schematic view of the docking station for use with the wireless communication device shown in FIG. 1A from a different angle. As shown in FIG. 1A and FIG. 1B, the communication system 1 includes a docking station 5 and a wireless communication device 60. The docking station 5 can be used with the wireless communication device 60 and includes a base 10, a handset 20, and an output device 30, as well as an output control device 40 (see FIG. 4) and a transmission device 50 (see FIG. 4), which are both disposed in the base 10. The wireless communication device 60 can be disposed on the base 10 to connect thereto.

As shown in FIG. 1A, the wireless communication device 60 includes a display device 61. The wireless communication device 60 performs wireless communication functions such as making a phone call or answering a phone call by receiving/transmitting communication signals. Hence, the wireless communication device 60 is portable and can be used outdoors. When the wireless communication device 60 is disposed on the base 10, the base 10 can be controlled by the wireless communication device 60, and the handset 20 can be used to communicate with others as if one was using a conventional desktop telephone. In a preferred embodiment, the wireless communication device 60 is a mobile phone which employs wireless communication protocols such as Wi-Fi, Wi-Max, or 3G (3rd-generation) mobile technology to perform wireless communication. In this embodiment, the display device 61 is a touch panel. The user can control the wireless communication device 60 through touching the display device 61 to perform functions such as making a phone call, answering a phone call, looking up a stored address book, etc. When the wireless communication device 60 is connected to the base 10, the image shown on the display device 61 is modified correspondingly. For instance, the display device 61 can show a set of numeric keys so that the user can make use of the numeric keys to dial. Besides, the display device 61 can show a set of function keys so that the user can make use of the function keys to perform other functions such as configuring the base 10. Furthermore, the connection status between the wireless communication device 60 and the base 10 can also be shown by the display device 61. However, in other embodiments, the wireless communication device 60 can have different structures. For instance, when there are keys disposed on the wireless communication device 60, the keys can be used to control the wireless communication device 60, and the display device 61 can be used as a regular display panel instead of a touch panel.

For conventional wireless communication devices, if the user wants to perform other functions while performing communication functions, employing additional equipment such as an earphone is usually unavoidable. However, the wireless communication device 60 and the handset 20 of the docking station 5 of the communication system 1 according to the present invention cooperate to achieve the same objective. In other words, when the user uses the handset 20 to communicate with others, the wireless communication device 60 can be operated simultaneously. Hence, the user can use the wireless communication device 60 to receive e-mails, look up a stored address book, or configure the settings at the same time as when answering a phone call. Furthermore, the user can use the wireless communication device 60 to control the base 10 or control other external equipment through the base 10.

Figure 2A:
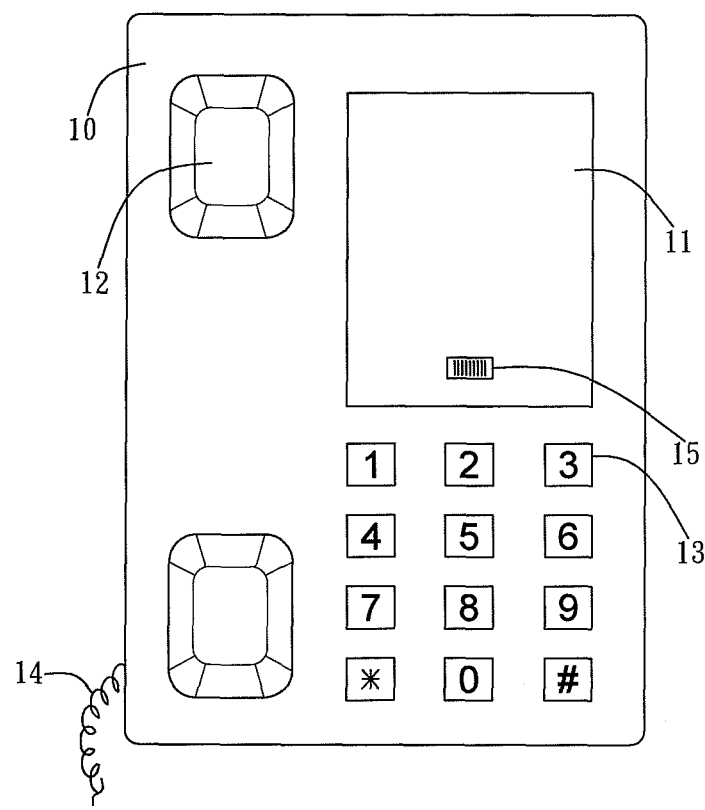
FIG. 2A is a schematic view of the base of the docking station for use with a wireless communication device shown in FIG. 1A.
Figure 2B:
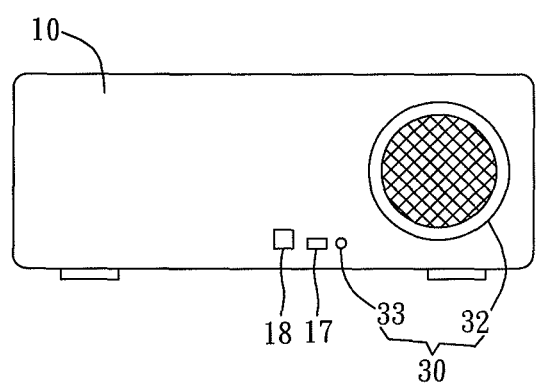
FIG. 2B is another schematic view of the base of the docking station for use with a wireless communication device shown in FIG. 2A from a different angle.
Figure 3:
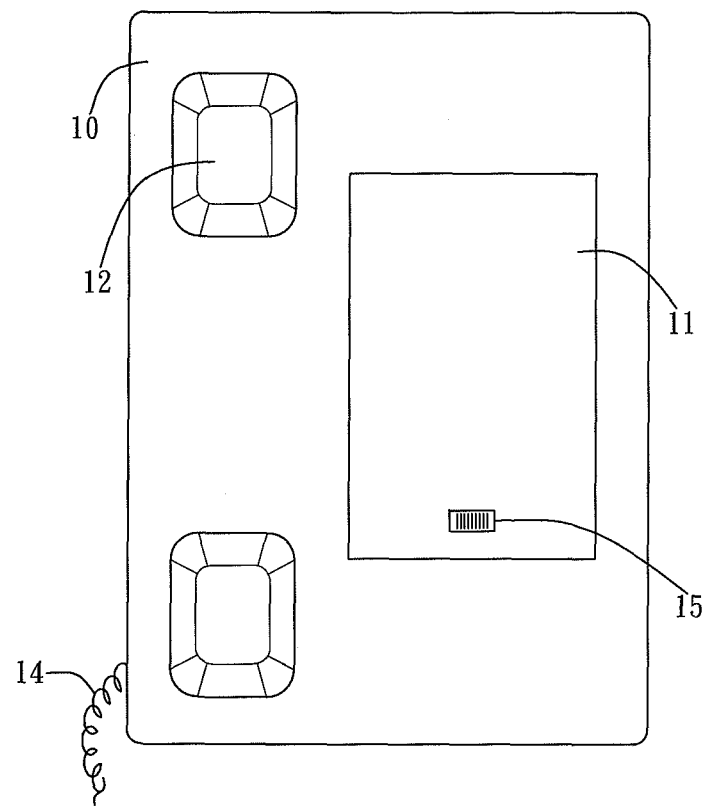
FIG. 3 is a schematic view of another embodiment of the base of the present invention of a docking station for use with a wireless communication device.

FIG. 2A is a schematic view of the base of the docking station for use with the wireless communication device shown in FIG. 1A; FIG. 2B is another schematic view of the base of the docking station for use with the wireless communication device shown in FIG. 2A from a different angle. The base 10 can be installed in indoor environments such as offices, conference rooms, residencies, etc. On one hand, the base 10 provides a relatively stable stand for the wireless communication device 60. On the other hand, the base 10 can perform other additional functions for the wireless communication device 60, such as charging or signal transformation. As shown in FIG. 2A and FIG. 2B, the base 10 includes a wireless communication device seat 11 and a handset seat 12 on which to put the wireless communication device 60 and the handset 20, respectively. In this embodiment, the base 10 has keys 13 disposed thereon. However, in other embodiments, as shown in FIG. 3, when there are no keys disposed on the base 10, functions such as dialing can be performed by the wireless communication device 60. The keys 13 can be used to control the base 10 or the wireless communication device 60 to perform functions such as dialing. Furthermore, in this embodiment, the base 10 connects to the handset 20 by a telephone line 14 as shown in FIG. 1. A wireless communication device connector 15 is disposed on the wireless communication device seat 11. When the wireless communication device 60 is put on the wireless communication device seat 11, the wireless communication device 60 will therefore connect with the wireless communication device connector 15. Consequently, the wireless communication device 60 connects with devices in base 10, such as the output control device 40 (see FIG. 4) and/or the transmission device 50 (see FIG. 4), through the wireless communication device connector 15. However, in other embodiments, other methods can be employed to connect the wireless communication device 60 and the handset 20 to the base 10. For instance, other types of cable interfaces or wireless interfaces employing technology such as Bluetooth or infrared ray communication can be employed. In this embodiment, the base 10 is powered by an external power supply. In other embodiments, other types of power supply such as batteries can be employed.

In this embodiment, other than telephoning functions such as receiving/transmitting communication signals through wireless or non-wireless means, non-telephoning functions such as receiving/transmitting e-mails, looking up a stored address book, and configuring the settings are all performed by wireless communication device 60. As a result, other than providing the keys 13 and the handset 20 to perform communication functions, the base 10 only works as an interface so as to connect the wireless communication device 60 to other devices such as the output device 30. However, in other embodiments, the base 10 can have other functions.

As shown in FIG. 1A and FIG. 1B, in this embodiment, the output device 30 includes an indicator lamp 31, a speaker 32 and an audio socket 33. The indicator lamp 31 is disposed on the handset 20 while the speaker 32 and the audio socket 33 are disposed on the base 10. However, in other embodiments, the output device 30 can be disposed in different manners. For instance, the indicator lamp 31 can also be disposed on the base 10. The audio socket 33 is an output for audio signals, wherein the audio socket 33 can be used as the socket for audio plugs such as earphone plugs or RCA plugs. The indicator lamp 31, the speaker 32 and the audio socket 33 can operate individually or operate in coordination. In one instance, when the wireless communication device 60 receives the communication signal which represents a phone call, the indicator lamp 31 and the speaker 32 can inform the user by lighting up and ringing so as to notify the user as a desktop telephone would. In another instance, when the user is using the handset 20 to communicate with others, a speaker can be employed to amplify the voice by connecting to the audio socket 33.

Figure 4:
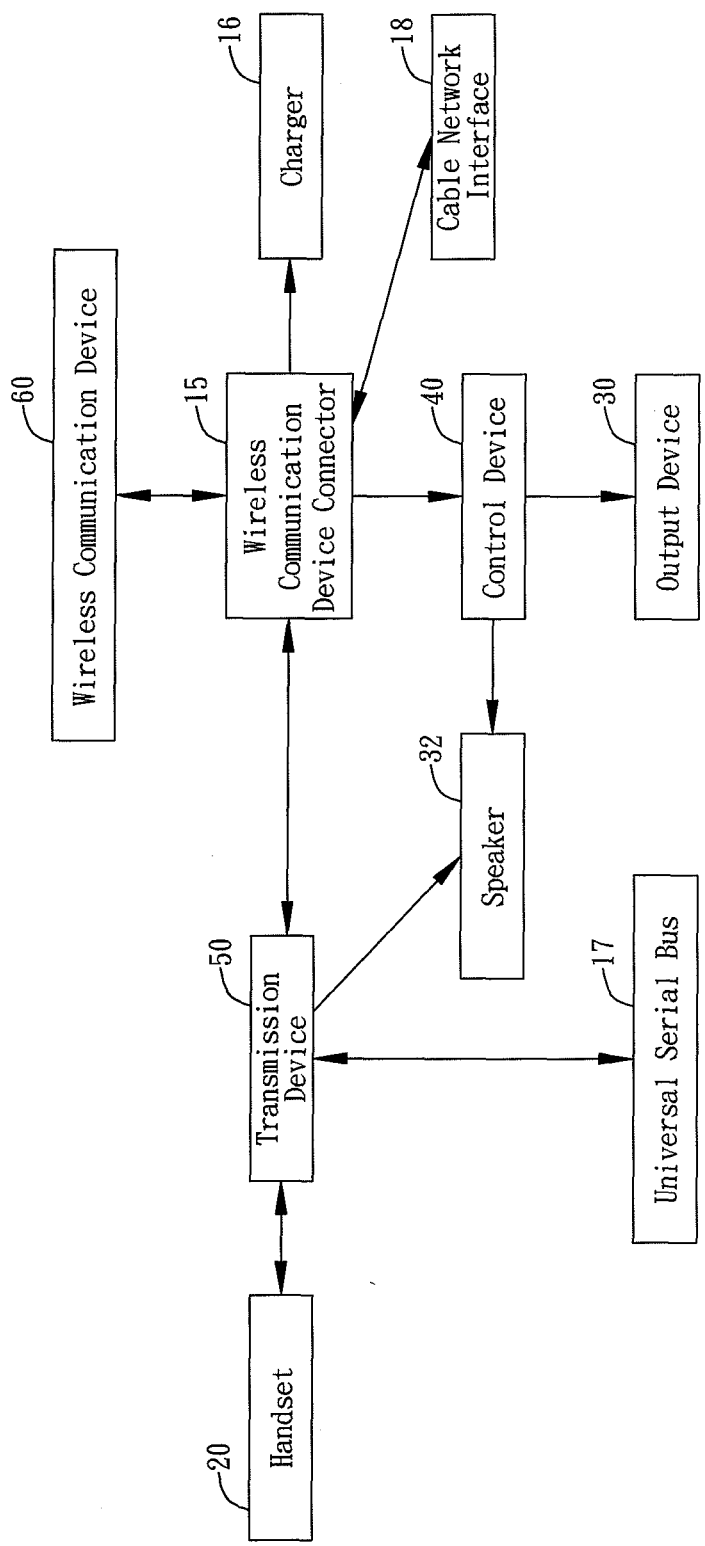
FIG. 4 is a block diagram of the disposition of the output control device and the transmission device of the present invention of a docking station for use with a wireless communication device.

FIG. 4 is a block diagram of the disposition of the output control device and the transmission device of the present invention of the communication system including a docking station and a wireless communication device. As shown in FIG. 4, when the wireless communication device 60 is put on the base 10 to connect to the control device 40 through the wireless communication device connector 15, the wireless communication device 60 can enable the output device 30 to perform output functions through the output control device 40. For instance, when the wireless communication device 60 receives the communication signal which represents a phone call, the indicator lamp 31 and the speaker 32 can inform the user by lighting up and ringing, respectively. In this embodiment, the output control device 40 is the driver circuit of the output device 30 which can drive different types of the output device 30 by the demand of the user. However, in other embodiments, a chip set or other kinds of circuit can be employed as the output control device 40.

When the wireless communication device 60 is placed on the base 10 to connect to the transmission device 50 through the wireless communication device connector 15 while receiving/transmitting communication signals, the wireless communication device 60 can control the handset 20 through the transmission device 50 so that the user can communicate with others through the handset 20. In this embodiment, the transmission device 50 is a chip set with the function of a digital/analog conversion which can perform digital/analog signal conversion between the wireless communication device 60 and the handset 20. However, in other embodiments, other kinds of circuit can be employed as the transmission device 50. Furthermore, in this embodiment, the output control device 40 and the transmission device 50 are individual devices. However, in other embodiments, they can be integrated in to a single device.

Furthermore, in this embodiment, the base 10 includes a charger 16, a universal serial bus (USB) 17, and a cable network interface 18. As shown in FIG. 4, when the wireless communication device 60 is put on the base 10 to connect to the charger 16 through the wireless communication device connector 15, the base 10 can charge the wireless communication device 60 through the charger 16. When the wireless communication device 60 is placed on the base 10 to connect to the transmission device 50 through the wireless communication device connector 15 for performing telephoning operations by receiving/transmitting communication signals, the wireless communication device 60 outputs/inputs signals by transmitting and receiving signals correspondingly, through the universal serial bus 17 by the transmission device 50. For instance, when the user uses the handset 20 to communicate with others, the universal serial bus 17 correspondingly outputs audio signals so that a speaker can be connected to the universal serial bus 17 to amplify the user's voice. In this embodiment, the transmission device 50 is a chip that is capable of controlling the universal serial bus. However, in other embodiments, other kinds of circuits can be employed as the transmission device 50.

However, in other embodiments, the base 10 can employ the universal serial bus 17 to supply power. Furthermore, the universal serial bus 17 can be employed to connect to other devices such as computers, so as to perform functions such as data transformation or controlling the base 10 through the computer. In addition, when the wireless communication device 60 is used in a noisy environment such as a factory, an indicator lamp can be connected to the universal serial bus 17, so that when the wireless communication device 60 receives the communication signal representing a phone call, the indicator light can correspondingly operate to inform the user of the call. Besides, in other embodiments, other interfaces can be employed to connect the base 10 to other devices such as computer.

When the wireless communication device 60 is solely used, wireless communication protocols such as Wi-Fi, Wi-Max, or 3G mobile technology can be employed to perform data transmission functions such as telephoning or data transmission. As shown in FIG. 4, in this embodiment, the cable network interface 18 is an Ethernet interface. However, in other embodiments, other kinds of cable network interfaces can be employed as the cable network interface 18. When the wireless communication device 60 is placed on the base 10 to connect to the Ethernet interface 18 through the wireless communication device connector 15, the wireless communication device 60 can switch to a mode which performs data transmission function through the Ethernet interface 18 by using Ethernet network protocols, wherein the switch can be performed automatically or manually. On the other hand, when the wireless communication device 60 is removed from the base 10, the wireless communication device 60 can therefore switch back to the mode which employs wireless communication protocols to perform data transmission function, wherein the switch can also be performed automatically or manually. In a preferred embodiment, the wireless communication system of the present invention can employ the fixed-mobile convergence (FMC) telephony to selectively switch between fixed network and mobile network so as to perform a smooth switch between cable network and wireless network. However, in other embodiments, when the wireless communication device 60 is placed on the base, wireless communication protocols can be employed to perform data transformation functions.

Although the present invention has been described through the above-mentioned related embodiments, the above-mentioned embodiments are merely the examples of the present invention. What needs to be indicated is that the disclosed embodiments are not intended to limit the scope of the present invention. On the other hand, the modifications possessing the essence or the scope of the claims or their equivalent dispositions are all contained in the scope of the present invention.

What is claimed is:

1. A communication system, comprising: a wireless communication device capable of conducting phone calls and transmission of data through wireless communication, the wireless communication device comprising a touch panel for operating the wireless communication device; and a docking station for use with the wireless communication device, comprising: a base including a wireless communication device connector for connecting the wireless communication device; a handset connecting to the base; a transmission device disposed on the base; and a cable network interface disposed on the base; when the wireless communication device is connected with the base: a fixed network and a mobile network is selectively switched between to conduct a phone call or transmission of data through the wireless communication or the cable network interface; during the phone call is conducted, the transmission device drives the handset in order to use the handset to conduct the phone call; and wherein when the wireless communication device is connected to the base, the touch panel correspondingly shows a screen including a set of keys, and the base can be controlled through the touch panel.

2. The communication system of claim 1, wherein the base further includes a charger, when the wireless communication device is connected to the base, the wireless communication device is charged through the charger.

3. The communication system of claim 1, wherein when the wireless communication device is connected to the base, the wireless communication device transmits data through the cable network interface.

4. The communication system of claim 1, further comprising an output device disposed on at least one of the base and the handset.

5. The communication system of claim 4, further comprising an output control device disposed on the base, wherein when the wireless communication device is connected to the base, the wireless communication device controls the output device through the output control device.

6. The communication system of claim 4, wherein the output device includes an indicator lamp, when the communication system receives a communication signal, the indicator lamp operates correspondingly.

7. The communication system of claim 4, wherein the output device includes a speaker, when the communication system receives a communication signal, the speaker operates correspondingly.

8. The communication system of claim 4, wherein the output device includes a speaker, when the wireless communication device is connected to the base and receives/transmits a communication signal, the wireless communication device selectively enables the speaker through the transmission device.

9. The communication system of claim 4, wherein the output device includes an audio socket.

10. The communication system of claim 1, wherein the base further includes a universal serial bus.

11. The communication system of claim 10, wherein the base supplies power through the universal serial bus.

12. The communication system of claim 10, wherein when the wireless communication device is connected to the base and transmits data, the wireless communication device selectively enables the universal serial bus to transmit data correspondingly.

13. The communication system of claim 1, wherein the handset is connected to the base through a telephone line.

14. The communication system of claim 1, wherein when the wireless communication device is connected to the base, the wireless communication device is capable of controlling the base.

15. The communication system of claim 1, wherein when the wireless communication device is connected to the base while the handset is used for conducting the phone call, the wireless communication device can be operated to simultaneously receive/transmit an electronic mail, look up a stored address book, configure the settings of the wireless communication device, or any operation of configuring the setting of the base can be operated.

16. The communication system of claim 1, wherein when the wireless communication device is connected to the base and receives/transmits a communication signal, the wireless communication device enables the handset through the transmission device.

* * * * *